(12) United States Patent
Lepine

(10) Patent No.: US 7,404,976 B2
(45) Date of Patent: Jul. 29, 2008

(54) METHOD OF ADMINISTERING A MILK SUBSTITUTE TO CRITICAL CARE ANIMALS

(75) Inventor: Allan J. Lepine, Lewisburg, OH (US)

(73) Assignee: The Iams Company, Dayton, OH (US)

( * ) Notice: Subject to any disclaimer, the term of this patent is extended or adjusted under 35 U.S.C. 154(b) by 1308 days.

(21) Appl. No.: 09/829,168

(22) Filed: Apr. 9, 2001

(65) Prior Publication Data

US 2002/0018828 A1    Feb. 14, 2002

Related U.S. Application Data

(63) Continuation of application No. 09/362,401, filed on Jul. 28, 1999, now Pat. No. 6,245,379, which is a continuation-in-part of application No. 09/163,778, filed on Sep. 30, 1998.

(51) Int. Cl.
    *A23K 1/00*    (2006.01)
(52) U.S. Cl. ............................................. 426/2; 426/805
(58) Field of Classification Search ................ 426/601, 426/657, 658, 805, 2
    See application file for complete search history.

(56) References Cited

U.S. PATENT DOCUMENTS

| | | |
|---|---|---|
| 4,294,856 A | 10/1981 | Kinumaki et al. |
| 4,351,849 A | 9/1982 | Meade |
| 4,614,653 A | 9/1986 | Kakade |
| 4,692,338 A | 9/1987 | Irvine et al. |
| 4,938,984 A | 7/1990 | Traitler et al. |
| 4,994,442 A | 2/1991 | Gil et al. |
| 5,085,874 A | 2/1992 | Jungvid |
| 5,221,668 A | 6/1993 | Henningfield et al. |
| 5,294,458 A | 3/1994 | Fujimori |
| 5,709,888 A | 1/1998 | Gil et al. |
| 5,714,161 A | 2/1998 | Crane |
| 5,733,884 A | 3/1998 | Barbul et al. |
| 5,766,621 A | 6/1998 | Trimbo et al. |
| 5,792,501 A | 8/1998 | Lepine |
| 5,882,714 A | 3/1999 | Lepine |
| 5,900,248 A | 5/1999 | Crane |
| 5,906,847 A | 5/1999 | Engel et al. |

FOREIGN PATENT DOCUMENTS

| | | |
|---|---|---|
| EP | 0 259 713 | 3/1988 |
| EP | 0 832 565 | 4/1998 |

OTHER PUBLICATIONS

Bernard, W. V. DVM, "Critical care in foals: Providing proper nutritional support", Veterinary Medicine, Dec. 1993, p. 1186-1189, vol. 88, No. 12.
Patil, G. R., and S. K. Gupta, "Milk and milk product substitutes to combat malnutrition", Indian Farming, Jan. 1978, p. 34-36, vol. 27, No. 10.
Lifshitz et al., "The Response to Dietary Treatment of Patients with Chronic Post-Infectious Diarrhea and Loctose Intolerance", Journal of the American College of Nutrition, 1990, p. 231-240, vol. 9, No. 3.
Vasquez-Garlbay et al., "Nutritional recovery in marasmus using soy formula enriched with L-methionine", Bol Med Hosp Infant Mex, Aug. 1989, p. 537-542, vol. 46.
Bowie, M.D. and I. D. Hill, "Management of persistent diarrhea in infants", Indian J Pediatr, 1987, p. 475-480, vol. 54, No. 4.
Soza, Cuillermo et al., "Nutritional recovery or marasmic infants with a milk formula supplemented by a flour product with a sweet lupine base", Rev Chil Pediatr, Sep.-Oct. 1979, p. 21-30, vol. 50, No. 5.
Gross, A. V., "Treatment and prophylaxis of iron deficiency anemia in preschool aged children", Zdravookhr Beloruss, 1979, p. 56-58, No. 3.
Oftedal, O., Lactation in the Dog: Milk Composition and Intake by Puppies, J. Nutr., 114:803-812 (1984).
Lonnerdal et al., "Development Changes in the Composition of Beagle Dog Milk", Am J Vet Res, vol. 42:662-666 (1981).

*Primary Examiner*—Arthur L Corbin
(74) *Attorney, Agent, or Firm*—Kelly L McDow; Kristin Kohler; Sarah Ann Dressel

(57) ABSTRACT

A method for providing nutrition to critical care animals such as dogs and cats is provided which comprises administering an amount of an artificially produced canine or feline milk substitute composition. The canine milk substitute composition comprises, on a dry matter basis, from about 35 to 45% by weight protein, from about 25 to 35% by weight fat, and from about 10 to 25% by weight carbohydrates. The feline milk composition comprises, on a dry matter basis, from about 30 to 50% protein, from about 25 to 50% fat, and from about 10 to 25% carbohydrates.

2 Claims, No Drawings

METHOD OF ADMINISTERING A MILK SUBSTITUTE TO CRITICAL CARE ANIMALS

CROSS REFERENCE TO RELATED APPLICATIONS

This application in a continuation of U.S. application Ser. No. 09/362,401 filed Jul. 28, 1999, now issued as U.S. Pat. No. 6,245,379 which is a Continuation-in-Part of U.S. application Ser. No. 09/163,778 filed Sep. 30, 1999.

BACKGROUND OF THE INVENTION

This invention relates to a method for providing nutrition to critical care animals, and more particularly, to a method of administering a milk substitute which substantially supplies the nutritional requirements of critical care animals such as cats and dogs.

The importance of administering proper nutrition to critical care animals such as cats and dogs is known. By "critical care", it is meant the medical treatment and supportive care given to animals that have an immediate life threatening condition such as an injury, or have suffered from illness or major surgery. Critical care animals are usually under extreme stress and may be in shock due to extensive trauma, systemic disease, cancer, chemotherapy, malnutrition or ingestion of toxins. For example, trauma may be induced by being hit by an automobile, gunshot wounds, bite wounds, burns, extensive abrasions, infection of the skin, and the like. These conditions may have acute onset as in the case of gunshot wounds, but may also be brought on by more chronic conditions such as malnutrition, neglect, end stages of chronic disease such as parasitic disease, hepatic, respiratory, or cardiac disease. Diseases resulting in critical care situations may be the result of metabolic dysfunction or infections such as fungal, viral, bacterial or parasitic infections.

Because of the stress the animals are under, the animals tend to have higher energy requirements relative to healthy animals and are often susceptible to malnutrition. Accordingly, provision of proper energy and other nutrients is therefore very important in the management of the critical care animal. Enteral feeding is a preferred method of providing nutrition versus other methods such as parenteral nutrition.

Accordingly, there is a need in the art for providing nutrition to critical care animals which substantially supplies the nutritional needs of such animals.

SUMMARY OF THE INVENTION

The present invention meets that need by providing a canine milk substitute and a feline milk substitute for administration to critical care dogs and cats. The milk substitutes provide a fatty acid profile and an amino acid profile which is not found in currently available milk replacers. In addition, the milk substitutes provide highly digestible nutrient sources which may be easily administered. The milk substitutes are also provided in a palatable form that encourages voluntary intake.

In accordance with one aspect of the present invention, a method for providing nutrition to a critical care canine is provided comprising administering an amount of an artificially produced canine milk substitute composition which comprises, on a dry matter basis, from about 35 to 45% by weight protein, from about 25 to 35% by weight fat, and from about 10 to 25% by weight carbohydrates. In a preferred embodiment of the invention, the composition comprises about 38% protein, about 28% fat, and about 19% carbohydrates.

The protein source preferably comprises casein and whey in a weight ratio of about 70:30. The source of fat is preferably selected from the group consisting of corn oil, canola oil, butter oil, arachidonic acid, docosahexaenoic acid and blends thereof.

The canine milk substitute composition also preferably contains fatty acids comprising, as a percentage of total fatty acids on a dry matter basis, from about 15 to 19% palmitic acid, from about 5 to 9% stearic acid, from about 34 to 38% oleic acid, from about 17 to 21% linoleic acid, from about 1 to 4% α-linolenic acid, from about 0.5 to 2% arachidonic acid, from about 0.2 to 1.0% docosahexaenoic acid (DHA), from about 2 to 5% Omega-3 fatty acids, from about 18 to 22% Omega-6 fatty acids, and from about 1 to 4% trans fatty acids. The composition preferably contains 27 to 37% by weight fatty acids on a dry matter basis.

The canine milk substitute composition also contains essential amino acids comprising, as a percentage of total essential amino acids on a dry matter basis, from about 6 to 10% arginine, 4 to 8% histidine, 8 to 12% isoleucine, 16 to 20% leucine, from about 13 to 17% lysine, from about 2 to 7% methionine, from about 6 to 10% phenylalanine, from about 8 to 12% threonine, from about 1 to 4% tryptophan, from about 9 to 13% valine, from about 2 to 5% cystine, and from about 2 to 6% tyrosine. The composition preferably contains from about 15 to 25% by weight essential amino acids on a dry matter basis.

The canine milk substitute composition also preferably contains, on a dry matter basis, from about 4 to 8% by weight lactose and from about 0.50% by weight fructooligosaccharide. The composition may also include mixtures of vitamins and minerals.

According to another aspect of the invention, a method for providing nutrition to a critical care feline is provided comprising administering a feline milk substitute composition comprising, on a dry matter basis, from about 30 to 50% protein, from about 25 to 50% fat, and from about 10 to 25% carbohydrates.

Preferably, the feline milk substitute composition contains protein in amounts from about 35 to 45%. More preferably, the composition contains protein in an amount of about 40%. As the protein source, it is preferred to use a combination of casein and whey (the whey being in the form of a protein concentrate) in a substantially 1:1 weight ratio. All references to the presence of whey in the feline milk substitute composition of the present invention are to whey in the form of a protein concentrate having a low lactose content.

Preferably, the composition contains fat in amounts from about 30 to 40%. More preferably, the composition contains fat in an amount of about 35%.

Preferably, the composition contains carbohydrates in amounts from about 13 to 20%.

More preferably, the composition contains carbohydrates in amounts from about 15 to 17%. As the source of carbohydrates in the composition, it is preferred to use a combination of lactose and maltodextrin.

The composition preferably further comprises arachidonic acid. Also, the composition preferably further comprises docosahexaenoic acid. In addition, the composition preferably further comprises butter oil, canola oil, and corn oil.

In accordance with yet another aspect of the present invention, a method of providing nutrition to a critical care feline is provided comprising administering an artificially produced feline milk substitute composition comprising protein, fat, and carbohydrates, and expressed as a percentage of total fatty acids on a dry matter basis, from about 17 to 20% linoleic acid, from about 0.5 to 1.0% arachidonic acid, and from about 0.2 to 0.4% docosahexaenoic acid.

Preferably, the linoleic acid in the composition is present in an amount of about 18%. Also, the composition preferably contains arachidonic acid in an amount of about 0.7%. In addition, the composition preferably contains docosahexaenoic acid in an amount of about 0.3%.

Preferably, the source of protein comprises casein and whey in a weight ratio of about 1:1 on a dry matter basis.

In accordance with another aspect of the present invention, a method for providing nutrition to a critical care feline is provided comprising administering an artificially produced feline milk substitute composition comprising protein, fat, and carbohydrates, and expressed as a percentage of total essential amino acids on a dry matter basis, from about 4.0 to 8.0% arginine, from about 1.0 to 3.0% tryptophan, and from about 2.0 to 5.0% valine.

Preferably, the arginine in the composition is present in an amount of about 6.5%. Also, the composition preferably contains tryptophan in an amount of about 1.7%. In addition, the composition preferably contains valine in an amount of about 3.7%.

Preferably, the source of protein in the composition comprises casein and whey in a weight ratio of about 1:1 on a dry matter basis.

Accordingly, it is a feature of the present invention to provide a method for providing nutrition to critical care canines or felines by administering a milk substitute which substantially supplies the nutrient requirements of the critical care animal. Other features and advantages of the invention will be apparent from the following description and the appended claims.

DETAILED DESCRIPTION OF THE PREFERRED EMBODIMENT

The feline and canine milk substitute compositions of the present invention are appropriate for administration to critical care animals as they provide high quality nutrient sources, they are highly digestible, and they provide a relatively high energy density. In addition, the milk replacers provide unique amino acid and fatty acid profiles. The substitute compositions may be provided in liquid form for tube feeding or they may provided any other form (e.g., powder) as long as they contain the preferred concentrations of protein, fat, and carbohydrates on a dry matter basis. Both the feline and canine milk substitutes have been formulated so that they closely match the nutrient profile of queen's milk or bitch milk.

With regard to the canine milk substitute composition, a study of bitch milk was undertaken to determine the concentration of true protein, total fat, total carbohydrates, the casein to whey ratio, the amino acid profile, and the fatty acid profile. Based on the data obtained, the canine milk replacer of the present invention was formulated and preferably contains about 38% protein, about 28% fat, and about 19% carbohydrates. The casein and whey in the composition have a weight ratio of about 70:30.

The source of fat in the canine milk replacer composition preferably comprises a blend of corn oil, canola oil, butter oil, arachidonic acid, and docosahexaenoic acid. This blend of fats is believed to provide a fatty acid profile which is close to that of bitch milk and comprises from about 15 to 19% palmitic acid, from about 5 to 9% stearic acid, from about 34 to 38% oleic acid, from about 17 to 21% linoleic acid, from about 1 to 4% α-linolenic acid, from about 0.5 to 2% arachidonic acid, from about 0.2 to 1.0% docosahexaenoic acid (DHA), from about 2 to 5% Omega-3 fatty acids, from about 18 to 22% Omega-6 fatty acids, and from about 1 to 4% trans fatty acids (expressed as a percentage of total fatty acids on a dry matter basis). The fatty acids preferably comprise about 25% to 35%, and most preferably, about 28% of the total composition on a dry matter basis.

The canine milk substitute composition also contains amounts of essential amino acids which exhibit a profile similar to that of actual bitch milk. Expressed as a percentage of total essential amino acids on a dry matter basis, the amino acids preferably comprise from about 6 to 10% arginine, 4 to 8% histidine, 8 to 12% isoleucine, 16 to 20% leucine, from about 13 to 17% lysine, from about 2 to 7% methionine, from about 6 to 10% phenylalanine, from about 8 to 12% threonine, from about 1 to 4% tryptophan, from about 9 to 13% valine, from about 2 to 5% cystine, and from about 2 to 6% tyrosine. The essential amino acids preferably comprise about 15% to 25%, and most preferably, about 20% of the total composition on a dry matter basis.

The canine milk substitute composition also preferably contains, on a dry matter basis, from about 4-8% by weight lactose and from about 0.50% by weight fructooligosaccharide.

Fructooligosaccharide (FOS) is preferably included in the formulation because studies have shown FOS to be beneficial to the intestinal health of many animals. FOS may be metabolized by beneficial intestinal bacterial species, such as Bifidobacterium. However, harmful intestinal bacteria, such as Salmonella, E. coli and Clostridia are unable to process FOS. Therefore, FOS appear to promote a healthy intestinal environment in animals.

The canine milk substitute composition may also contain vitamins and minerals including, but not limited to Vitamin A acetate, cholecalciferol, d, 1-alpha tocopheryl acetate, cyanocobalamin, riboflavin, niacinaminde, d-calcium pantothenate, folic acid, thiamin mononitrate, pyridoxine hydrochloride, biotin, inositol, ascorbic acid, dextrose, tricalcium phosphate, potassium chloride, potassium citrate, magnesium sulfate, monosodium phosphate, zinc sulfate, copper sulfate, manganese sulfate, sodium selenite, potassium iodide, cobalt sulfate, and ferric methionine.

With regard to the feline milk substitute composition of the present invention, a study of queen's milk was undertaken. Based on the data obtained, the feline milk substitute of the present invention was formulated. In one embodiment, the composition comprises, as expressed on a dry matter basis, from about 30 to 50% protein, from about 25 to 50% fat, and from about 10 to 25% carbohydrates. The source of protein preferably comprises casein and whey in a weight ratio of about 1:1.

Preferably, the composition contains protein in amounts from about 35 to 45%. More preferably, the composition contains protein in an amount of about 40%.

Preferably, the composition contains fat in amounts from about 30% to about 40%. More preferably, the composition contains fat in an amount of about 35%.

Preferably, the composition contains carbohydrates in amounts from about 13 to 20%. More preferably, the composition contains carbohydrates in amounts from about 15 to 17%. The source of carbohydrates preferably comprises combinations of lactose and maltodextrin, most preferably in substantially equal amounts by weight. More preferably, the source of carbohydrates comprises from about 6.5 to 10% lactose and from about 6.5 to 10% maltodextrin. Most preferably, the source of carbohydrates comprises from about 7.5 to 8.5% lactose and from about 7.5 to about 8.5% maltodextrin. The presence of maltodextrin in the composition has been found to decrease the osmotic load in the intestine and results in a more desirable stool consistency.

The composition preferably further comprises arachidonic acid. Also, the composition preferably further comprises docosahexaenoic acid. In addition, the composition preferably further comprises butter oil, canola oil, and corn oil.

The feline milk substitute of the present invention may contain particular amounts of some fatty acids. Percentages are expressed as a percentage of total fatty acids on a dry matter basis. Linoleic acid is preferably present in amounts from about 17 to about 20%. More preferably, the linoleic acid in the composition is present in an amount of about 18%. Arachidonic acid is preferably present in amounts from about 0.5 to about 1.0%. More preferably, the composition contains arachidonic acid in an amount of about 0.7%. Also, docosahexaenoic acid is preferably present in amounts from about 0.2 to about 0.4%. More preferably, docosahexaenoic acid is present in an amount of about 0.3%.

In addition, other fatty acids are preferably present. Palmitic acid is preferably present in amounts from about 15 to about 25%. Stearic acid is preferably present in amounts from about 3 to about 9%. Oleic acid is preferably present in amounts from about 33 to about 38%.

The feline milk substitute of the present invention may also contains particular amounts of some essential amino acids. Percentages are expressed as a percentage of total essential amino acids on a dry matter basis. Arginine is preferably present in amounts from about 4.0 to about 8.0%. Histidine is preferably present in amounts from about 2.0 to about 4.0%. Isoleucine is preferably present in amounts from about 2.0 to about 5.0%. Leucine is preferably present in amounts from about 8.0 to about 13.0%. Lysine is preferably present in amounts from about 5.0 to about 8.0%. Methionine is preferably present in amounts from about 1.0 to about 5.0%. Phenylalanine is preferably present in amounts from about 2.0 to about 6.0%. Threonine is preferably present in amounts from about 3.0 to about 7.0%. Tryptophan is preferably present in amounts from about 1.0 to about 3.0%. Valine is preferably present in amounts from about 2.0 to about 5.0%.

In order that the invention may be more readily understood, reference is made to the following example which is intended to illustrate the invention, but not limit the scope thereof.

EXAMPLE 1

A canine milk substitute was prepared in accordance with the present invention by combining the following ingredients:

| Formula A | |
| --- | --- |
| Ingredient | Percentage |
| Water | 80.0 |
| Na/Ca Caseinate | 5.233 |
| Whey Protein Concentrate | 3.491 |
| Maltodextrin | 2.646 |
| Butter Oil | 2.412 |
| Canola Oil | 1.764 |
| Mineral Premix[1] | 1.147 |
| Lactose | 1.134 |
| Corn Oil | .869 |
| Dried Egg Yolk | .506 |
| Emulsifier | .200 |
| Vitamin Premix[2] | .128 |
| Arachidonic Acid Supplement | .100 |
| Fructooligosaccharide | .100 |
| L-Histidine HCl | .090 |
| L-Arginine | .060 |

-continued

| Formula A | |
| --- | --- |
| Ingredient | Percentage |
| Choline Chloride | .055 |
| DHA Supplement | .040 |
| Ascorbic Acid | .025 |

[1]The "Mineral Premix" contained one or more of the following: tricalcium phosphate, potassium chloride, potassium citrate, magnesium sulfate, monosodium phosphate, zinc sulfate, copper sulfate, manganese sulfate, sodium selenite, potassium iodide, cobalt sulfate, and ferric methionine.

[2]The "Vitamin Premix" contained one or more of the following: Vitamin A acetate, cholecalciferol, d,l-alpha tocopheryl acetate, cyanocobalamin, riboflavin, niacinaminde, d-calcium pantothenate, folic acid, thiamin mononitrate, pyridoxine hydrochloride, biotin, inositol, and ascorbic acid.

To compare the formulation of the present invention with currently available milk replacer products, an analysis of several commercially available bitch milk replacer formulas was conducted. The test formulas were JustBorn™ (JBD), available from Farnam Pet Products, Esbilac® Milk Replacer for Puppies (ESB), available from Pet-Ag, Inc., and Nurturall Puppy Balanced Milk Replacer (Nurtal), available from Veterinary Products Laboratory. Table 1 shows the protein, fat and carbohydrate content of those commercial formulas compared with the composition of the present invention (Formula A). Natural bitch milk was used as a baseline value (100)*.

*The milk fat values were obtained from Lonnerdal et al., "Developmental Changes in the Composition of Beagle Dog Milk", Am. J. Vet. Res., Vol. 42:662-666 (1981) and Oftedal, "Lactation in the Dog: Milk Composition and Intake by Puppies", J. Nutr., 114:803-812 (1984).

TABLE 1

| | Bitch | ESB | JBD | Nurtal | Formula A |
| --- | --- | --- | --- | --- | --- |
| Protein | 100 | 83.1 | 74.4 | 78.8 | 96.6 |
| Fat | 100 | 132.6 | 107 | 103.6 | 95 |
| Carbohydrates | 100 | 69.3 | 114.4 | 115.3 | 103.9 |

As can be seen from Table 1, the composition of Formula A is much closer to natural bitch milk than the other products.

The fatty acid and amino acid profiles of the commercially available products were also analyzed and compared with bitch milk and the composition of the present invention as shown below in Tables 2 and 3. The comparisons are expressed as a percent of control (bitch=100%). The values for the amino acids and fatty acids are expressed as a percent of total protein and total lipids, respectively.

TABLE 2

| FATTY ACID PROFILE | | | | | |
| --- | --- | --- | --- | --- | --- |
| | Control | ESB | JBD | Nurtal | Formula A |
| Palmitic | 100 | 44.4 | 58.4 | 53.9 | 70.8 |
| Stearic | 100 | 517.2 | 90.3 | 97.6 | 251.7 |
| Oleic | 100 | 78.1 | 73.4 | 71.8 | 97.7 |
| Linoleic | 100 | 77.2 | 309.7 | 337.9 | 133.1 |
| Arachidonic | 100 | 6.5 | 0 | 0 | 74.6 |
| DHA | 100 | 8.6 | 0 | 0 | 42.9 |
| Trans Fatty Acids | 100 | 577.9 | 17.6 | 0 | 62.9 |

TABLE 3

AMINO ACID PROFILE

|  | Bitch | ESB | JBD | Nurtal | Formula A |
|---|---|---|---|---|---|
| Arginine | 100 | 84.6 | 71.5 | 95.4 | 79.3 |
| Histidine | 100 | 54 | 55.7 | 73.3 | 99.1 |
| Isoleucine | 100 | 106.7 | 99.8 | 107.7 | 108.1 |
| Leucine | 100 | 77.2 | 68 | 79.3 | 82 |
| Lysine | 100 | 92.1 | 146.6 | 145.9 | 140.9 |
| Methionine | 100 | 230.3 | 47 | 71.7 | 79 |
| Cystine | 100 | 63.8 | 41.5 | 53.6 | 111.6 |
| Phenylalanine | 100 | 105.4 | 112.3 | 135.2 | 118.5 |
| Tryrosine | 100 | 110.6 | 290.7 | 132.5 | 90.4 |
| Threonine | 100 | 120.3 | 78.8 | 93.2 | 123.7 |
| Tryptophan | 100 | 124.6 | 64.9 | 163.2 | 168.4 |
| Valine | 100 | 85.9 | 78.6 | 91.1 | 89.8 |

EXAMPLE 2

To the determine the effect of milk composition on growth and body composition of puppies, forty colony bred Beagle puppies from 7 litters were randomly assigned to three treatments: bitch milk (CTL) (n=15), milk replacer I (MR-I from Example 2) (n=14), and milk replacer II (MR-II) (n=11) comprising 33% protein and 40% fat (Esbilac® Milk Replacer for Puppies from Pet-Ag, Inc.) All puppies were allowed to nurse the dam for 24 hours. Milk replacer treatments were subsequently fed to the puppies every 3 hours for days 1-2 and decreased to 4 feedings/day for the remainder of the study (30 days). No differences were detected in intake between the MR puppies; however, puppies fed MR-I had increased average daily weight gain and gain efficiency over MR-II fed puppies, i.e., when the amount of product consumed was measured against the weight gained, MR-I fed puppies had a greater increase in body weight, indicating that the MR-I formulation is better at meeting the growth needs of puppies. The body composition of puppies fed MR-I did not differ from CTL puppies in body fat percentage, but was higher in lean tissue than both CTL and MR-II. Puppies fed MR-II were found to have the highest body fat and lowest lean tissue. These data indicate that the MR-I formulation, which was more similar to bitch milk in fatty acid profile and amino acid profile, results in enhanced structural tissue growth indicating an improved nutritional status in neonatal puppies.

EXAMPLE 3

A feline milk substitute was formulated based on the queen's milk data. The formulation is:

Formula A

| Ingredient | Percentage |
|---|---|
| Water | 80.464 |
| Whey Protein Concentrate | 4.000 |
| Na/Ca Caseinate | 4.000 |
| Butter Oil | 2.779 |
| Canola Oil | 2.033 |
| Lactose | 1.550 |
| Maltodextrin | 1.550 |
| Mineral Premix | 1.076 |
| Corn Oil | 1.031 |
| Dried Egg Yolk | 0.450 |
| L-Histidine HCl | 0.208 |
| Emulsifier | 0.192 |
| Arginine | 0.146 |
| Fructooligosaccharide | 0.100 |
| Taurine | 0.100 |
| Choline Chloride | 0.090 |
| Arachidonic Acid Supplement | 0.090 |
| Vitamin Premix | 0.060 |
| DHA Supplement | 0.044 |
| Ascorbic acid | 0.028 |

Formula A contains a "Vitamin Premix." This is a prepared composition containing a variety of vitamins. Specifically, the "Vitamin Premix" composition contains:

| Ingredient | Percentage |
|---|---|
| Dextrose | 76.82 |
| Vitamin E Supplement | 9.90 |
| Niacin | 2.93 |
| Ascorbic Acid | 2.87 |
| Vitamin A Acetate | 1.86 |
| Biotin Supplement | 1.80 |
| Calcium Pantothenate | 0.94 |
| Thiamine Hydrochloride | 0.82 |
| Pyridoxine Hydrochloride | 0.78 |
| Vitamin $B_{12}$ Supplement | 0.63 |
| Riboflavin Supplement | 0.21 |
| Inositol | 0.19 |
| Vitamin $D_3$ Supplement | 0.16 |
| Folic Acid | 0.09 |

Formula A also contains a "Mineral Premix." This is a prepared composition containing a variety of nutritional minerals. Specifically, the "Mineral Premix" composition contains:

| Ingredient | Percentage |
|---|---|
| Tricalcium phosphate | 25.69 |
| Potassium Chloride | 23.44 |
| Poassium citrate | 16.37 |
| Magnesium Sulfate | 15.72 |
| Monosodium phosphate | 15.44 |
| Ferric methionine | 1.67 |
| Zinc sulfate | 0.89 |
| Copper sulfate | 0.50 |
| Manganese sulfate | 0.21 |
| Sodium selenite | 0.06 |
| Potassium Iodide | 0.004 |
| Cobalt sulfate | 0.004 |

Fructooligosaccharide (FOS) was included in the formulation because studies have shown FOS to be beneficial to the intestinal health of many animals. FOS may be metabolized by beneficial intestinal bacterial species, such as Bifidobacterium. However, harmful intestinal bacteria, such as *Salmonella*, *E. coli* and *Clostridia* are unable to process FOS. Therefore, FOS appears to promote a healthy intestinal environment in animals.

To determine the improvement of the present invention over currently available products, an analysis of several commercially available queen's milk replacer formulas was conducted. The tested formulas are Just Born® from Farnam Pet products (JBD), Kittylac® from CRP (KLAC), Golden Cat Milk™ from Onelac (GCM), and KMR® from PetAg (KMR). The fatty acid profiles and amino acid profiles of these products were analyzed using the techniques described above (see Materials and Methods). Also, the fatty acid profile and amino acid profile of the formula listed above (Formula A) was compared to queen's milk. The data is presented in Tables 1 and 2 below.

TABLE 1

Percentage of Fatty Acid Content Relative to Queen's Milk

| | Queen | JBD | KLAC | GCM | KMR | Formula A |
|---|---|---|---|---|---|---|
| Palmitic | 100 | 47 | 56 | 89 | 67 | 73 |
| Stearic | 100 | 49 | 186 | 176 | 103 | 139 |
| Oleic | 100 | 69 | 75 | 97 | 63 | 97 |
| Linoleic | 100 | 278 | 28 | 94 | 195 | 98 |
| Arachidonic | 100 | 0 | 14 | 14 | 14 | 106 |
| Docosahexaenoic | 100 | 0 | 0 | 33 | 0 | 100 |

TABLE 2

Percentage of Amino Acid Content Relative to Queen's Milk

| | Queen | JBD | KLAC | GCM | KMR | Formula A |
|---|---|---|---|---|---|---|
| Arginine | 100 | 77 | 55 | 60 | 68 | 110 |
| Histidine | 100 | 79 | 75 | 93 | 68 | 81 |
| Isoleucine | 100 | 126 | 119 | 135 | 119 | 142 |
| Leucine | 100 | 73 | 76 | 84 | 70 | 82 |
| Lysine | 100 | 93 | 98 | 103 | 83 | 100 |
| Methionine | 100 | 57 | 91 | 96 | 70 | 110 |
| Phenylalanine | 100 | 141 | 144 | 148 | 126 | 131 |
| Threonine | 100 | 98 | 95 | 88 | 90 | 110 |
| Tryptophan | 100 | 35 | 18 | 29 | 29 | 91 |
| Valine | 100 | 153 | 150 | 167 | 153 | 104 |

A preferred formulation for the feline milk substitute of the present invention contains 40% protein, 35% fat and 15% lactose (plus 0.50% FOS) on a dry matter basis which closely matches the analytical data on queen's milk. The protein blend and the fat blend which are used in the product of the present invention will result in amino acid profiles and fatty acid profiles which are much improved as compared to those observed for other commercially available products.

EXAMPLE 4

The canine and feline milk replacers of the present invention were fed to 8 adult dogs and 8 adult cats, respectively, to determine the effect of the milk replacers on stool characteristics. The amount of milk replacer consumed was gradually increased by decreasing the quantity of dry food until the milk replacer was the sole source of nutrition as shown in Table 1.

| Dry diet[a]:Milk replacer[b] | Duration(d) |
|---|---|
| 100:0 | 1-2 |
| 67:33 | 3-4 |
| 33:67 | 5-6 |
| 0:100 | 7-8 |

[a]Dry diet comprised Iams Chunks or Iams Cat Food
[b]Dry diet was replaced at a rate of 30 ml of canine milk replacer formula or feline milk replacer formula, respectively, for each 10 g of dry diet To address the possibility that a gradual increase in the proportion of milk replacer consumed by the adult dogs and cats would allow for some limited adaptation to the diet change over time, additional dogs (4) and cats (8) were provided quantitative replacement of the dry diet by milk replacer without any transition. Daily intakes and stool scores were recorded. Water was available ad libitum.

Acceptance of the canine milk replacer by the adult dogs was outstanding with only two dogs consuming consistently below the targeted milk replacer amounts. Stool scores remained unchanged from the values prior to the intake of milk replacer and did not decrease as the volume of milk replacer increased. An immediate transition from dry diet to a 100% replacement by the canine milk replacer formula resulted in intakes generally less than targeted. It can be concluded, however, that providing 50 to 100% of the daily energy intake to the adult dog without a transition period does not have a substantial negative impact on stool characteristics.

Voluntary intake of milk replacer by the adult cat was less consistent than observed for the adult dog. The majority of the cats consumed the feline milk replacer at or near the target level when offered at 33% of the daily energy intake. The number of cats achieving the target intake decreased as the target intake increased to 66% and 100%. This occurred despite offering the milk replacer in two equal feedings in an attempt to compensate for the smaller gastric volume relative to the dog. Stool scores were also more variable than observed in the dog but generally ranged from 3 to 4.

A much wider range of voluntary intakes were noted in the adult cat transitioned immediately to 100% milk replacer than was observed with the adult dog. Only one cat successfully achieved the target intake while the remaining animals consumed between 4 and 79% of their daily energy intake as milk replacer. Stool scores remained between 3 and 4.

Overall, the results indicate minimal negative effects on stool scores of healthy adult dogs and cats, i.e., the results show that adult animals can consume an amount equivalent to their daily energy requirement without producing loose stools or diarrhea generally associated with milk products. In addition, no negative effects on activity, attitude or behavior were observed in the dogs or cats.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method for providing nutrition to a critical care canine comprising: administering to said canine an amount of an artificially produced canine milk substitute composition comprising, on a dry matter basis, from about 35 to 45% protein, from about 25 to 35% fat, from about 10 to 25% carbohydrates, and about 0.50% of a fructooligosaccharide; wherein said protein comprises casein and whey in a weight ratio of about 70:30, and wherein said composition contains fatty acids expressed as a percentage of total fatty acids on a dry matter basis, of from 15 to 19% palmitic acid, from about 5 to 9% stearic acid, from about 34 to 38% oleic acid, from about 17 to 21% linoleic acid, from about 1 to 4% a-linoleic acid, from about 0.5 to 2% arachidonic acid, from about 0.2 to 1% docosahexaenoic acid (DHA), from about 2 to 5% Omega-3 fatty acids, from about 18 to 22% Omega-6 fatty acids, and from about 1 to 4% trans fatty acids.

2. A method for providing nutrition to a critical care canine comprising: administering to said canine an amount of an artificially produced canine milk substitute composition comprising, on a dry matter basis, from about 35 to 45% protein, from about 25 to 35% fat, from about 10 to 25% carbohydrates, and about 0.50% of a fructooligosaccharide;

wherein said protein comprises casein and whey in a weight ratio of about 70:30, and wherein said composition contains amino acids expressed as a percentage of total essential amino acids on a dry matter basis of from about 6 to 10% arginine, from about 4 to 8% histidine, from about 8 to 12% isoleucine, from about 16 to 20% leucine, from about 13 to 17% lysine, from about 2 to 7% methionine, from about 6 to 10% phenylalanine, from about 8 to 12% threonine, from about 1 to about 4% tryptophan, from about 9 to 13% valine, from about 2 to 5% cystine, and from about 2 to 6% tyrosine.

* * * * *